United States Patent [19]
Kitazawa et al.

[11] Patent Number: 5,415,099
[45] Date of Patent: May 16, 1995

[54] MECHANICAL IGNITION SENSOR

[75] Inventors: Yasuho Kitazawa; Kenji Matsui, both of Aichi, Japan

[73] Assignee: Kabushiki Kaisha Tokai-Rika-Denki-Seisakusho, Aichi, Japan

[21] Appl. No.: 301,642

[22] Filed: Sep. 7, 1994

[30] Foreign Application Priority Data

Sep. 9, 1993 [JP] Japan .............................. 5-049103 U
Sep. 9, 1993 [JP] Japan .............................. 5-049104 U

[51] Int. Cl.⁶ ..................... B60R 21/32; H01H 35/14; F42C 1/04
[52] U.S. Cl. ...................................... 102/274; 280/734
[58] Field of Search ................... 280/734; 102/274; 89/1.14

[56] References Cited

U.S. PATENT DOCUMENTS

| | | | |
|---|---|---|---|
| 4,204,703 | 5/1980 | Okada | 280/734 |
| 4,889,068 | 12/1989 | Tabata et al. | 102/274 |
| 4,938,140 | 7/1990 | Kinoshita et al. | 102/274 |
| 5,080,394 | 1/1992 | Mori et al. | 280/734 |
| 5,279,227 | 1/1994 | Nishizawa | 102/274 |
| 5,328,204 | 7/1994 | Kawaguchi et al. | 280/734 |

FOREIGN PATENT DOCUMENTS 3045354 4/1991 Japan .
4007965 1/1992 Japan .
5042005 6/1993 Japan .

*Primary Examiner*—David Brown
*Attorney, Agent, or Firm*—Sixbey, Friedman, Leedom & Ferguson

[57] ABSTRACT

In a push-type safety lever, a contact surface between a safety lever and a trigger lever is slanted. In a rotation-type safety lever, its circumferential surface is gradually increased in radiuses from an area in which a safety lever does not contact a trigger lever to an area in which it contacts the trigger lever. A mechanical ignition sensor is thereby provided so as to prevent the safety lever and the trigger lever from catching on each other and to reliably operate the safety device.

15 Claims, 12 Drawing Sheets

MECHANICAL IGNITION SENSOR

BACKGROUND OF THE INVENTION

1. Field of the Invention

The present invention relates to a mechanical ignition sensor for sensing a state of a sudden deceleration of a vehicle or the like.

2. Description of the Related Art

As a seat belt system mounted to a vehicle, there is known, for example, one provided with a so-called pretensioner wherein a webbing applied to an occupant is retracted a predetermined amount when the vehicle suddenly decelerates. The looseness of the webbing applied to the occupant is thus forcibly removed so as to tighten the webbing to thereby improve occupant-restraining characteristics.

With this type of pretensioner, there is known one wherein a take-up shaft of a webbing retractor is forcibly rotated so as to tighten a webbing and one wherein a buckle is forcibly pulled so as to tighten a webbing. For example, the latter pretensioner is provided with a gas generator having a mechanical ignition sensor. A cylinder is attached to the gas generator and coupled to a buckle via a wire or the like.

When the vehicle suddenly decelerates, a state of a sudden deceleration is detected by the mechanical ignition sensor and the gas generator is operated to instantaneously generate gas. As a result, the cylinder which generated the gas is moved and the resultant moving force is transmitted to the buckle via the wire so as to forcibly move the buckle, thereby tightening the webbing.

The mechanical ignition sensor employed in such pretensioner basically comprises an ignition pin for igniting a detonator, an inertial body, which is inertially moved by a large acceleration, and a trigger member, which is interposed between the ignition pin and the inertial body so as to prevent the ignition pin from moving. Further, a safety device is provided thereat for preventing a malfunction of the mechanical ignition sensor when the sensor is assembled to the vehicle or the like.

The safety device includes a safety lever, which engages the inertial body moved by the inertial force and prevents the movement of the inertial body regardless of the operation of the inertial force. When the safety lever engages the inertial body, the movement of the inertial body is forcibly prevented as described above. Accordingly, even if external force is unnecessarily applied to the vehicle when the safety lever is assembled thereto, the malfunctioning of the sensor is prevented.

The safety device (the safety lever) of the conventional mechanical ignition sensor having the aforementioned structure must be reliably operated, and the operation thereof must be smoothly and reliably performed. For example, to confirm sensitivity and other operational properties of the mechanical ignition sensor and to test reliability of the operation, the operation test is performed by temporarily setting the sensor to an operative state (a state in which the safety device is released) by the operation of the safety lever. Then, when the sensor is properly assembled to the gas generator, the sensor must be set to an inoperative state (a state in which the safety device is operating) by the operation of the safety lever. Namely, the safety lever provided at the mechanical ignition sensor must be reliably operated between the state in which it is operating and the state in which it is released, and the operation thereof must be performed smoothly.

After the conventional safety device (the safety lever) is temporarily released, it is difficult to set the device to the operative state (the state in which the sensor is inoperative). Also, the operation of the conventional device is complicated and cannot be smoothly performed. Therefore, there is a room for improvement, and a solution to this problem has been desired.

On the other hand, due to a structure of a webbing retractor provided with a pretensioner, that of a buckle device or the mounting direction of the mechanical ignition sensor with respect to the vehicle, the conventional mechanical ignition sensor having the above structure is structured for exclusive use with either a left-hand side occupant seat or a right-hand side occupant seat of the vehicle.

Namely, the directions of relative movement of the inertial body, for example, are different (opposite) between the mechanical ignition sensor for the left-hand side occupant seat and the one for the right-hand side occupant seat. Consequently, the inertial body as well as the aforementioned safety device (the safety lever), which prevents the movement of the inertial body, is also structured for exclusive use with either the left-hand side occupant seat or the right-hand side occupant seat. As a result, parts for the mechanical ignition sensor were prevented from being used in common by the left-hand side occupant seat and the right-hand side occupant seat. The range over which the parts can be applied was hindered from being increased.

Further, the safety device (the safety lever) of such mechanical ignition sensor must be reliably operated and the operation thereof must be smoothly and reliably performed. For example, to confirm sensitivity and other operational properties of the mechanical ignition sensor and to test reliability of the operation, the operation test is performed by temporarily setting the sensor to an operative state (the state in which the safety device is released) by the operation of the safety lever. Then, when the sensor is properly assembled to the gas generator, the sensor must be set to an inoperative state (the state in which the safety device is operating) by the operation of the safety lever. Namely, the operation of the safety lever provided at the mechanical ignition sensor must be performed smoothly and reliably.

SUMMARY OF THE INVENTION

With aforementioned in view, an object of the present invention is to provide a mechanical ignition sensor in which the operation and the release of the safety device can be effected reliably and smoothly without preventing the stable operation of the sensor.

A further object of the present invention is to provide a mechanical ignition sensor in which parts can be used in common and the operation and the release of the safety device can be effected smoothly and reliably without preventing the stable operation of the sensor.

According to a first aspect of the present invention, a mechanical ignition sensor, comprising: an ignition pin movably disposed along an axial direction of the ignition pin and moved in the axial direction by an urging force of a firing spring so as to ignite a detonator; an inertial mass body always urged by a bias spring and moved by the inertial force against the urging force of the bias spring when a predetermined load acts on the inertial mass body; a trigger lever disposed between said ignition pin and said inertial mass body and pivotably supported by a supporting shaft in the direction of approaching and moving away from said ignition pin, said trigger lever including an engaging portion which engages said ignition pin, said engaging portion normally engaging said ignition pin and being pressed by said inertial mass body so as to prevent said trigger lever from rotating around said supporting shaft, while said engaging portion is pressed by said ignition pin in the direction of moving away from said ignition pin, said ignition pin is held against the urging force of said firing spring at a position which is separated from said detonator, when said inertial mass body is moved, the state in which the rotation of said trigger lever is prevented by said inertial mass body is released so as to rotate said trigger lever in a direction of moving away from said ignition pin and to allow the movement of said ignition pin; and a safety lever which is located so as to correspond to an end portion of said trigger lever on the side opposite said engaging portion with respect to said supporting shaft and which is movably disposed in the axial direction of said ignition pin, said safety lever including an inclined surface which contacts the end portion of said trigger lever and is formed so as to slant with respect to the moving direction of said ignition pin along the axial line, said inclined surface normally engaging the end portion of said trigger lever so as to prevent said trigger lever from rotating around said supporting shaft, said safety lever moving along the axial direction of said ignition pin so that said inclined surface is disengaged from said trigger lever and said trigger lever can rotate around said supporting shaft.

According to a second aspect of the present invention, a mechanical ignition sensor, comprising: an ignition pin movably disposed along an axial direction of the ignition pin and moved in the axial direction by an urging force of a firing spring so as to ignite a detonator; an inertial mass body always urged by a bias spring and moved by the inertial force against the urging force of the bias spring when a predetermined load acts on the inertial mass body; a trigger lever disposed between said ignition pin and said inertial mass body and pivotably supported by a supporting shaft in the direction of approaching and moving away from said ignition pin, said trigger lever including an engaging portion which engages said ignition pin, said engaging portion normally engaging said ignition pin and being pressed by said inertial mass body so as to prevent said trigger lever from rotating around said supporting shaft, while said engaging portion is pressed by said ignition pin in the direction of moving away from said ignition pin, said ignition pin is held against the urging force of said firing spring at a position which is separated from said detonator, when said inertial mass body is moved, the state in which the rotation of said trigger lever is prevented by said inertial mass body is released so as to rotate said trigger lever in a direction of moving away from said ignition pin and to allow the movement of said ignition pin; and a safety lever which is rotatably located so as to correspond to an end portion of said trigger lever on the side opposite said engaging portion with respect to said supporting shaft, a circumferential surface of said safety lever normally limiting movement of the end portion of said trigger lever and preventing said trigger lever from rotating around said supporting shaft, and limitation of movement of the end portion of said trigger lever being released by the rotation of said safety lever so as to allow said trigger lever to rotate around said supporting shaft.

According to a third aspect of the present invention, the mechanical ignition sensor according to the second aspect of the present invention, wherein the circumferential surface of said safety lever normally abuts the end portion of said trigger lever so as to prevent said trigger lever from rotating around said supporting shaft, and the state in which the circumferential surface abuts the end portion of said trigger lever is released by the rotation of said safety lever so as to allow said trigger lever to rotate around said supporting shaft, and further, said safety lever is formed so that a rotating circumferential surface of said safety lever, which corresponds to the end portion of said trigger lever, has gradually increased in radiuses from an area in which the circumferential surface does not abut said trigger lever to an area in which the circumferential surface abuts said trigger lever.

In the mechanical ignition sensor according to the first aspect of the present invention, the ignition pin is normally located at a position separated from the detonator against the urging force of the firing spring. The inertial mass body enters a rotation locus of the trigger lever by the bias spring. Further, the engaging portion of the trigger lever engages and holds the ignition pin in a state in which the trigger lever is rotated in a direction of approaching the ignition pin. The rotation of the trigger lever is prevented by the inertial mass body and the holding of the ignition pin is maintained.

In the state in which the safety device is operating (the state in which the sensor is inoperative), the inclined surface of the safety lever engages the end portion of the trigger lever so as to prevent the trigger lever from rotating around its supporting shaft. In this state, even if a large acceleration acts on the mechanical ignition sensor and the inertial mass body inertially moves, the trigger lever is not rotated and the holding of the ignition pin is not released.

On the other hand, when the safety lever is moved along the axial line of the ignition pin, the inclined surface of the safety lever separates from the end portion of the trigger lever and becomes disengaged therefrom. Accordingly, the trigger lever can rotate around its supporting shaft and the safety device becomes inoperative (the sensor becomes operative).

When a large acceleration acts on the mechanical ignition sensor in this state, the inertial mass body inertially moves so as to be separated from the rotation locus of the trigger lever. Accordingly, holding of the trigger lever by the inertial mass body is released. The trigger lever is pressed in a direction of moving away from the ignition pin by the ignition pin which is urged by the firing spring, and is pivoted in a direction of moving away from the ignition pin. The holding of the ignition pin by the engaging portion of the trigger lever is thereby released. The ignition pin is moved in its axial direction by the urging force of the firing spring so as to ignite the detonator.

In the mechanical ignition sensor relating to the first aspect of the present invention, the inclined surface of the safety lever, which contacts the end portion of the trigger lever, is formed so as to slant with respect to the direction of movement of the ignition pin along the axial line. Accordingly, the safety lever can be smoothly moved either in the operating direction or the releasing direction. For example, there is a case in which the safety lever is moved from the state in which the safety device is operating to the state in which the safety device is released, and thereafter, the safety lever is moved in the opposite direction so as to be reset to the state in which the safety device is operating. Even in this case, the inclined surface of the safety lever engages the trigger lever while smoothly sliding against each other. There are no drawbacks such as the trigger lever and the inclined surface of the safety lever catching on each other or interfering with each other.

Therefore, the safety lever is smoothly operated and can be reliably set to the state in which the safety device is operating and to the state in which it is released.

In the mechanical ignition sensor of the second aspect of the present invention, the ignition pin is normally located at a position separated from the detonator against the urging force of the firing spring. The inertial mass body enters the rotation locus of the trigger lever by the bias spring. Further, the engaging portion of the trigger lever engages and holds the ignition pin in a state in which the trigger lever is pivoted in the direction of approaching the ignition pin. The rotation of the trigger lever is prevented by the inertial mass body so as to maintain the holding of the ignition pin.

Further, in the state in which the safety device is operating (the slate in which the sensor is inoperative), the circumferential surface of the safely lever limits movement of the end portion of the trigger lever so as to prevent the trigger lever from totaling around its supporting shaft. Consequently, in this state, even if the large acceleration acts on the mechanical ignition sensor so that the inertial mass body inertially moves, the trigger lever does not rotate around the supporting shaft. The holding of the ignition pin is not released.

On the other hand, when the safety lever is pivoted, the stale in which the movement of the end portion of the trigger lever is limited is released. The trigger lever can rotate around the supporting shaft and the safely device becomes inoperative (the sensor becomes operative).

When the large acceleration acts on the mechanical ignition sensor in this state, the inertial mass body inertially moves and separates from the rotation locus of the trigger lever. Accordingly, the holding of the trigger lever by the inertial mass body is released. The trigger lever is pressed in the direction of moving away from the ignition pin by the ignition pin which is urged by the firing spring, and is rotated in the direction of moving away from the ignition pin. The holding of the ignition pin by the engaging portion of the trigger lever is thereby released. The ignition pin is moved in its axial direction by the urging force of the firing spring so as to ignite the detonator.

In the mechanical ignition sensor relating to the second aspect of the present invention, the rotation of the trigger lever is prevented by the safety lever. In other words, the safety lever is provided so as to correspond only to the trigger lever, and does not need to prevent the movement of the inertial mass body. Accordingly, when the safety lever is applied to either the left-hand side occupant seat or the right-hand side occupant seat, it does not have to be different. The same safety lever can be used by the left-hand side occupant seat and the right-hand side occupant seat. Alternatively, there is a case in which the directions of the relative movement of the inertial mass body are different (opposite) between the case in which the safety lever is used by the left-hand side occupant seat and the case in which it is used by the right-hand side occupant seat. Even in this case, the inertial mass body itself can be applied and used in common by the left-hand side occupant seat and the right-hand side occupant seat by simply reversing the positions at which the bias spring is disposed.

In this way, the inertial mass body and the safety lever can be used in common by both the left-hand side occupant seat and the right-hand side occupant seat. Moreover, both the inertial mass body and the safety lever do not have to be structured for exclusive use with either the left-hand side occupant seat or the right-hand side occupant seat.

In the mechanical ignition sensor according to the third aspect of the present invention, in the state in which the safety device is operating (the state in which the sensor is inoperative), the circumferential surface of the safety lever abuts the end portion of the trigger lever so as to prevent the trigger lever from rotating around its supporting shaft. In this state, even if the large acceleration acts on the mechanical ignition sensor and the inertial mass body inertially moves, the trigger lever is not rotated and the holding of the ignition pin is not released. On the other hand, when the safety lever is rotated, the safety lever does not abut the trigger lever and the trigger lever can rotate around its supporting shaft. The safety device is thereby released (the sensor becomes operative).

Here, the safety lever is formed so that its rotating circumferential surface, which corresponds to the end portion of the trigger lever, has gradually increased in radiuses from the area in which the safety lever does not abut the trigger lever to the area in which it abuts the trigger lever, Accordingly, the safety lever can be smoothly pivoted either in the operating direction or the releasing direction. For example, there is a case in which the safety lever is pivoted from the state in which the safety device is operating to the state in which it is released, and thereafter, the safety lever is pivoted in the opposite direction so as to be reset to the state in which the safety device becomes operative. Even in this case, the rotating circumferential surface of the safety lever abuts the trigger lever while smoothly sliding against each other. As a result, there are no drawbacks such as the trigger lever and the rotating circumferential surface of the safety lever catching on each other or interfering with each other.

Therefore, the safety lever is smoothly operated and can be reliably set to the state in which the safety device is operating and to the state in which it is released.

As described above, the mechanical ignition sensor relating to the first aspect of the present invention achieves a superior effect in that the stable operation is not prevented and the operation and the release of the safety device can be reliably and smoothly effected.

As described above, the mechanical ignition sensor relating to the second aspect of the present invention achieves a superior effect hereinbelow.

The safety lever is formed not to prevent the movement of the inertial mass body but to prevent the rotation of the trigger lever. The safety lever is provided so as to correspond only to the trigger lever. Accordingly, when the safety lever is applied to either the left-hand side occupant seat or the right-hand side occupant seat, it does not need to be different. The safety lever can be used in common by both the left-hand side occupant seat and the right-hand side occupant seat. Alternatively, there is a case in which the directions of the relative movement of the inertial mass body are different (opposite) between the case in which the safety lever is used by the left-hand side occupant seat and the case in which it is used by the right-hand side occupant seat. Even in this case, the inertial mass body itself can be applied and used in common by both the left-hand side occupant seat and the right-hand side occupant seat by simply reversing the positions at which the bias spring is disposed. Namely, the stable operation is not prevented and parts can be used in common by both the left-hand side occupant seat and the right-hand side occupant seat.

In the mechanical ignition sensor relating to the third aspect of the present invention, the safety lever is formed so that its rotating circumferential surface, which corresponds to the end portion of the trigger lever, has gradually increased in radiuses from the area in which the safety lever does not abut the trigger lever to the area in which it abuts the trigger lever. Accordingly, the safety lever can be smoothly rotated either in the operating direction or the releasing direction. As a result, the operation and release of the safety device can be smoothly and reliably effected.

DESCRIPTION OF THE PREFERRED EMBODIMENTS

Figure 1:
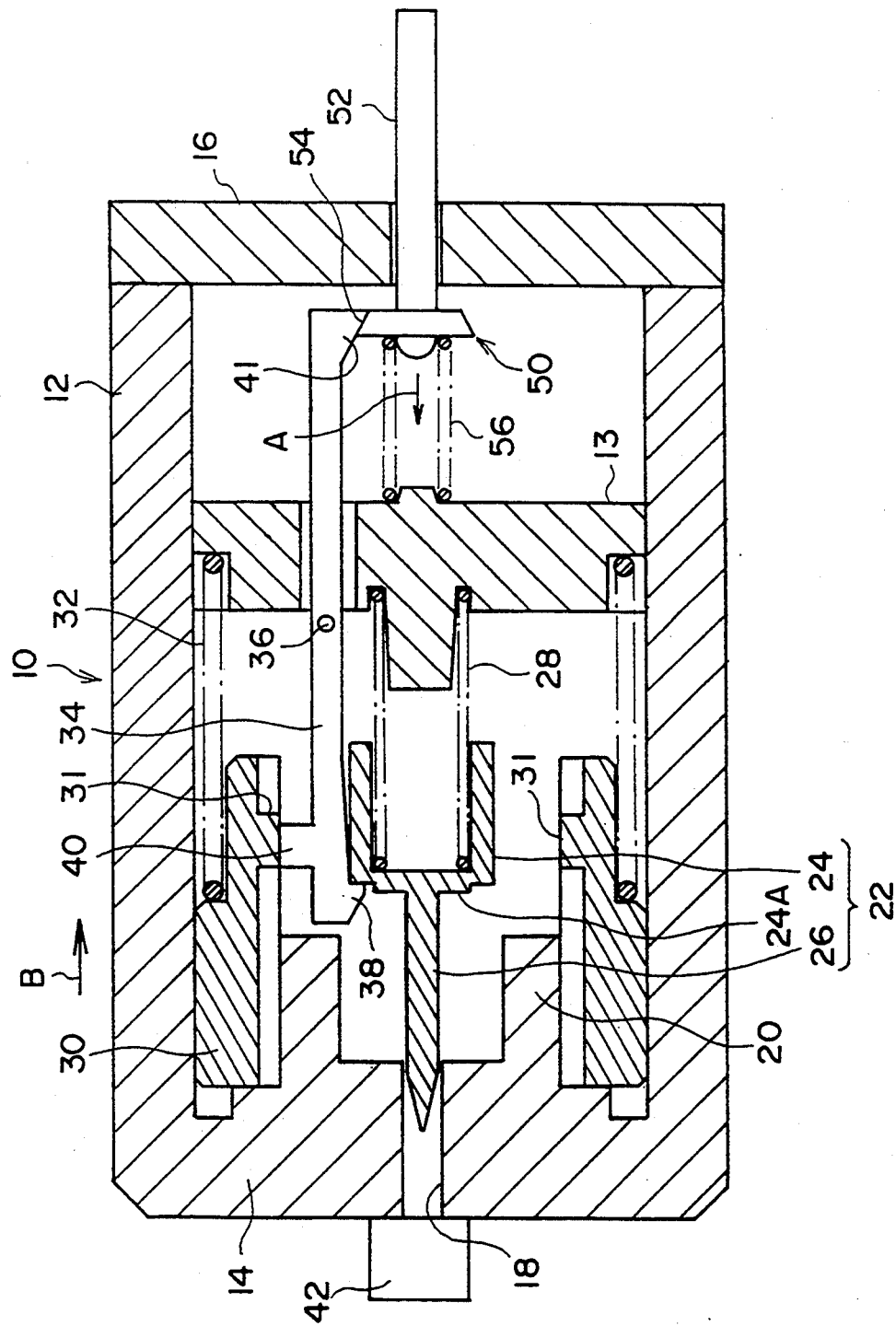
FIG. 1 is a cross-sectional view showing an initial state of a mechanical ignition sensor relating to a first embodiment of the present invention.
Figure 3:
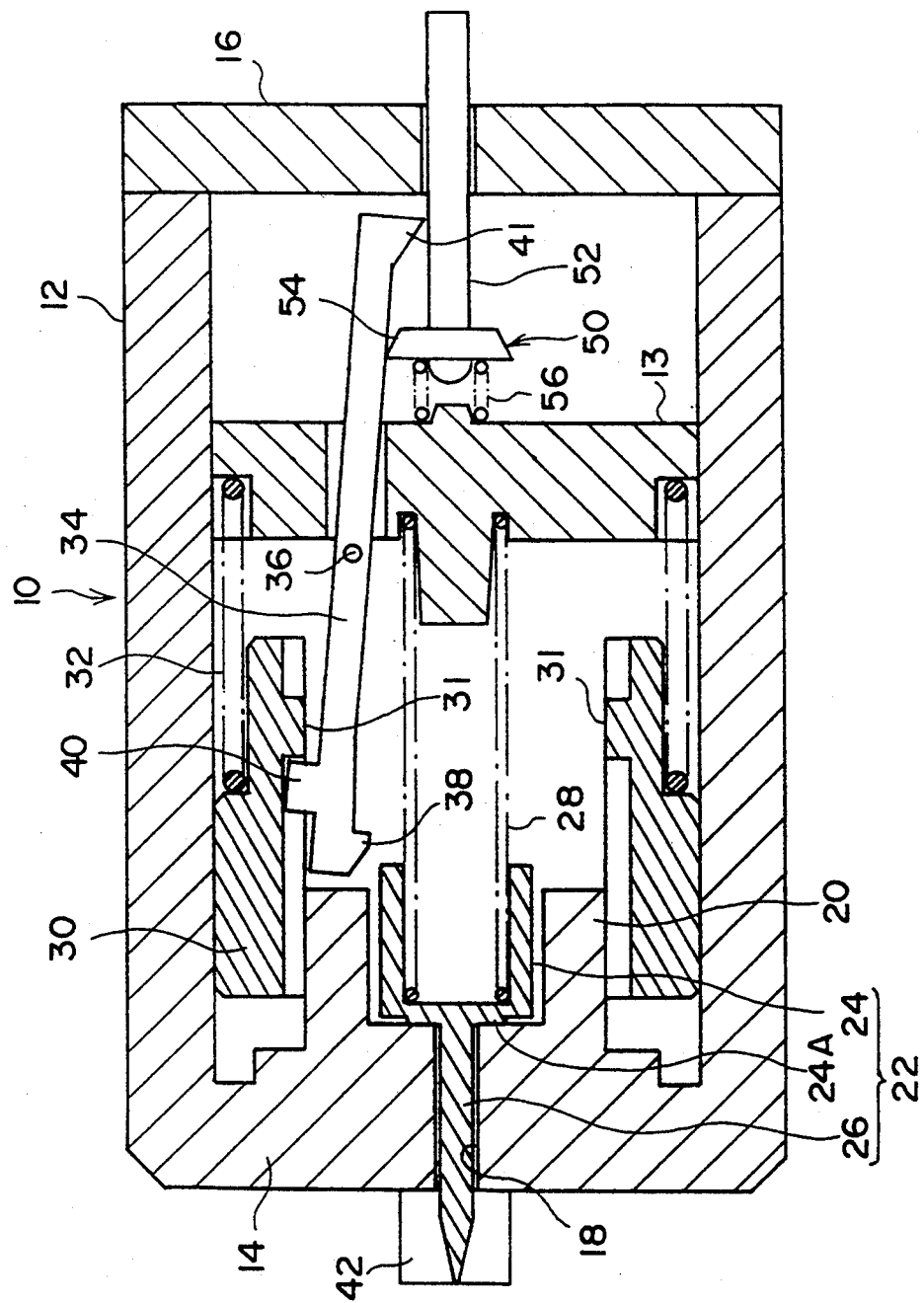
FIG. 3 is a cross-sectional view showing the state of the mechanical ignition sensor after having finished operation in accordance with the first embodiment of the present invention.

FIGS. 1 and 3 illustrate a cross-sectional view of a mechanical ignition sensor 10 relating to a first embodiment of the present invention.

The mechanical ignition sensor 10 includes a case 12. The case 12 is shaped in a cylindrical form having a bottom wall 14 at one end thereof. The open side of the case 12 is sealed by a plate 16. In the bottom wall 14 of the case 12, a through-hole 18 is formed along an axial line. In addition, a substantially-cylindrical guide 20 is provided at the bottom wall 14 so as to coaxially project toward the inner side of the case 12.

An ignition pin 22 is disposed inside the case 12. The ignition pin 22 is composed of a main body 24, which has a substantially cylindrical form and a convex portion 26, which is integrally formed with a bottom wall 24A of the main body 24. The outside diameter of the main body 24 corresponds to the inside diameter of the guide 20. The main body 24 can enter the guide 20 by slidably moving within the case 12 along an axial line. On the other hand, the convex portion 26 projects out of the through-hole 18 which is formed in the bottom wall 14 in a state in which the ignition pin 22 (the main body 24) has moved toward the bottom wall 14 of the case 12 as far as it can go.

An inner wall 13 is provided in a longitudinal intermediate portion of the case 12. Further, a firing spring 28 is disposed between the ignition pin 22 and the inner wall 13, and always urges the ignition pin 22 in the direction of the through-hole 18.

On the other hand, an inertial mass body 30 is provided around the guide 20. The inertial mass body 30 is formed into a substantially cylindrical shape and is accommodated between the surrounding walls of the case 12 and the guide 20 so as to be movable. A bias spring 32 is disposed between the inertial mass body 30 and the inner wall 13, and always urges the inertial mass body 30 in the direction of the bottom wall 14.

A trigger lever 34 is disposed between the inertial mass body 30 and the ignition pin 22. The trigger lever 34 is supported by a shaft 36 in a longitudinal direction intermediate portion thereof so as to be pivotable. A tip end of the trigger lever 34 is bent toward the ignition pin 22 so as to form an engaging portion 38. The engaging portion 38 is engageable with the ignition pin 22.

The trigger lever 34 pivots around the shaft 36 in such a way that the engaging portion 38 can move toward or away from the ignition pin 22. In a state in which the engaging portion 38 of the trigger lever 34 has engaged the main body 24 of the ignition pin 22, the ignition pin 22, which is urged by the firing spring 28, is held in a position in which its convex portion 26 is retracted from the through-hole 18.

On the side which is opposite the ignition pin 22 and which is in the vicinity of the tip end portion of the trigger lever 34, a slide holding portion 40 is formed so as to project toward the inertial mass body 30. The slide holding portion 40 corresponds to a slide portion 31, which is formed on the inertial mass body 30, and is structured so that it linearly contacts the slide portion 31. Namely, the inertial mass body 30 is normally positioned by the bias spring 32 so as to approach the bottom wall 14 of the case 12 as far as it can. In this state, the slide portion 31 of the inertial mass body 30 abuts the slide holding portion 40 of the trigger lever 34. The engaging portion 38 of the trigger lever 34 engages the main body 24 of the ignition pin 22, and holds the ignition pin 22 in a position in which its convex portion 26 is retracted from the through-hole 18. Further, when the inertial mass body 30 moves in the direction of moving away from the bottom wall 14, the slide portion 31 of the inertial mass body 30 moves relative to the slide holding portion 40 of the trigger lever 34 while linearly contacting therewith.

Figure 2:
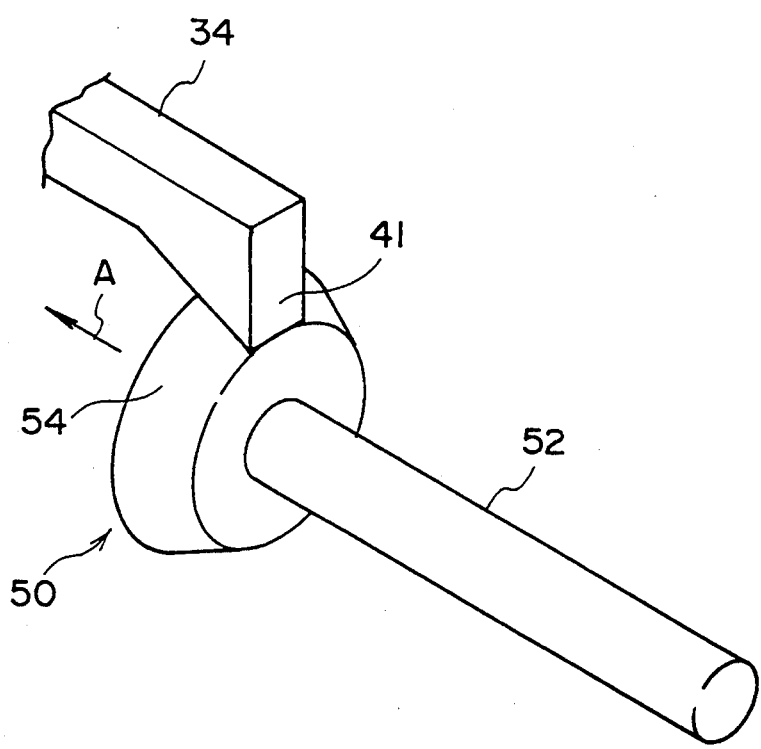
FIG. 2 is a perspective view which shows a shape of a safety lever of the mechanical ignition sensor relating to the first embodiment of the present invention, and which shows a relationship between the safety lever and a trigger lever in a state in which both of them are engaged.

On the other hand, the rear end portion of the trigger lever 34 (the end portion opposite the engaging portion 38) penetrates through the inner wall 13 and reaches the vicinity of the plate 16. Further, as illustrated in FIG. 2, a holding portion 41, which is formed into a wedge-shape and projects toward the axial line of the ignition pin is formed. A safety lever 50 is disposed in the vicinity of the holding portion As illustrated in FIG. 2, the safety lever 50 is formed into a disc-shape and a shaft portion 52 is integrally attached to the axially central portion of the safety lever 50. An inclined surface 54, which slants in a taper-shape, is formed at a circumferential surface of the safety lever 50. In a state in which the inclined surface 54 corresponds to the holding portion 41 of the trigger lever 34, the shaft portion 52 is positioned along the same axial line as the ignition pin 22 and is supported by the plate 16 so as to be movable along the axial line. In addition, the shaft portion 52 can be operated from outside by an unillustrated releasing device. Further, a return spring 56 is disposed between the safety lever 50 and the inner wall 13 and always urges the safety lever 50 in the direction of the plate 16 (i.e., the direction in which the inclined surface 54 engages the holding portion 41 of the trigger lever 34).

The inclined surface 54 normally engages the holding portion 41 of the trigger lever 34 by the urging force of the return spring 56. The safety lever 50 thereby prevents the trigger lever 34 from rotating around the shaft 36. On the other hand, when the shaft portion 54 of the safety lever 50 is operated from outside so that the safety lever 50 is moved against the urging force of the return spring 56 and in the direction of the ignition pin 22 along the axial line, the inclined surface 54 separates from the holding portion 41 so as to be disengaged from the trigger lever 34. Consequently, the trigger lever 34 can rotate around the shaft 36.

The above-structured mechanical ignition sensor 10 is assembled to, for example, a gas generator (unillustrated) used for a pretensioner. The gas generator contains a gas-generating agent. Further, a detonator 42 for igniting and combusting the gas-generating agent is disposed at the mechanical ignition sensor 10. The detonator 42 is located at the mechanical ignition sensor 10 along the axial line in a state in which the mechanical ignition sensor 10 is assembled to the gas generator. In the assembled state, the through-hole 18 in the case 12 faces the detonator 42 so that the convex portion 26 of the ignition pin 22, which can project from the through-hole 18, can strike the detonator 42.

Next, the operation of the first embodiment will be explained.

In the mechanical ignition sensor 10 of the first embodiment having the above-described structure, the ignition pin 22 is normally disposed in a position illustrated in FIG. 1. Namely, the ignition pin 22 is disposed at a position separated from the detonator 42 against the urging force of the firing spring 28 (the position which is retracted from the through-hole 18 in the case 12). In this position, the engaging portion 38 of the trigger lever 34 engages the main body 24 of the ignition pin 22, thereby holding the ignition pin 22. Further, the inertial mass body 30 enters the position nearest the bottom wall 14, that is, the rotation locus of the trigger lever 34. The slide portion 31 abuts the slide holding portion 40 of the trigger lever 34 so as to prevent the rotation of the trigger lever 34. The holding of the ignition pin 22 is thereby maintained.

Further, as illustrated in FIG. 2, in the state in which the safety device is operating (the state in which the sensor is inoperative), the inclined surface 54 of the safety lever 50 engages the holding portion 41 of the trigger lever 34 so as to prevent the trigger lever 34 from rotating around the shaft 36. In this state, even if a large acceleration acts on the mechanical ignition sensor 10 and the inertial mass body 30 inertially moves (even if the slide portion 31 moves relative to the slide holding portion 40 of the trigger lever 34 so as to be separated), the trigger lever 34 is not pivoted and the holding of the ignition pin 22 is not released.

Figure 4:
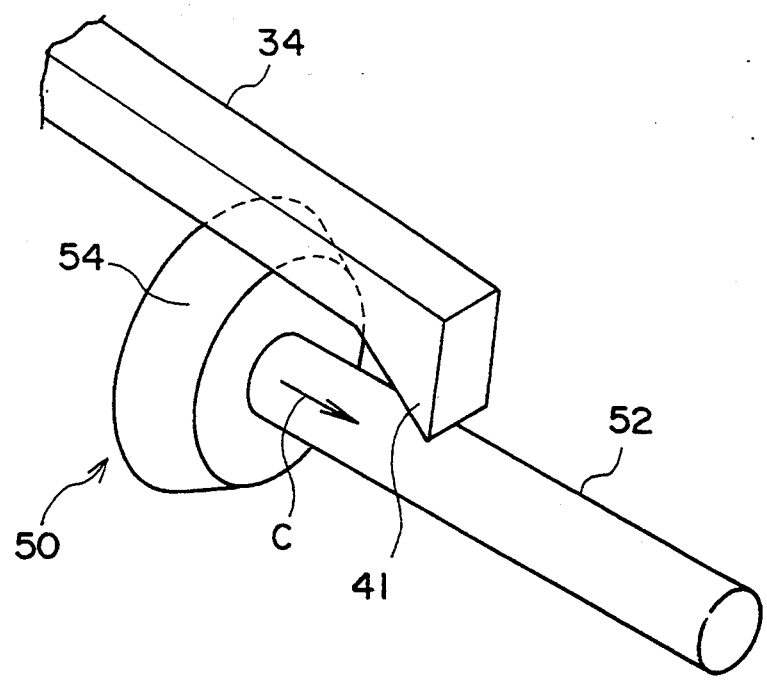
FIG. 4 is a perspective view, corresponding to FIG. 2, which shows a state in which the safety lever and the trigger lever of the mechanical ignition sensor relating to the first embodiment of the present invention are disengaged.

On the other hand, the shaft portion 52 of the safety lever 50 is operated from outside so that the safety lever 50 is moved against the urging force of the return spring 56 and in the direction (the direction of arrow A in FIGS. 1 and 2) of movement of the ignition pin 22 along the axial line. Here, as illustrated in FIG. 4, the inclined surface 54 is separated from the holding portion 41 and is disengaged from the trigger lever 34. Accordingly, the trigger lever 34 can be rotated around the shaft 36 and the safety device becomes inoperative (the sensor becomes operative).

When a large acceleration acts on the mechanical ignition sensor 10, the inertial mass body 30 inertially moves in the direction of arrow B in FIG. 1 and is separated from the rotation locus of the trigger lever 34.

In this case, the inertial mass body 30 (the slide portion 31) moves while linearly contacting the slide holding portion 40 of the trigger lever 34. The slide holding portion 40 of the trigger lever 34 is separated from the slide portion 31 of the inertial mass body 30 so that the holding is released. In this state, the trigger lever 34 is pressed by the ignition pin 22, which is urged by the firing spring 28, in the direction of separating from the ignition pin 22, and is rotated by moment in the direction of separating from the ignition pin 22. Accordingly, the engaging portion 38 of the trigger lever 34 is separated from the main body 24 of the ignition pin 22 so as to release the holding of the ignition pin 22. As a result, the ignition pin 22 moves in the axial direction by the urging force of the firing spring 28, and the convex portion 26 projects outwardly from the through-hole 18 (the state shown in FIG. 3).

This causes the convex portion 26 of the ignition pin 22 to strike and ignite the detonator 42. When the detonator 42 is ignited, the gas-generating agent in the gas generator is ignited and combusted, thereby activating a pretensioner, for example, In the mechanical ignition sensor 10 relating to the first embodiment, the holding portion 41 of the trigger lever 34 and the inclined surface 54 of the safety lever 50, which contacts the holding portion 41, are formed so as to be inclined with respect the moving direction of the ignition pin 22 along the axial line. Therefore, the safety lever 50 can be smoothly moved either in the operating direction or the releasing direction.

For example, there is a case in which the safety lever 50 is moved in the direction of arrow A in FIGS. 1 and 2 from the state (the state shown in FIGS. 1 and 2) in which the safety device is operating to the state (the state shown in FIG. 4) in which the safety device is released, and thereafter, the safety lever 50 is moved again in the opposite direction (the direction of arrow C in FIG. 4) so as to be reset to the state in which the safety device is operating. Even in this case, the inclined surface 54 of the safety lever 50 and the holding portion 41 of the trigger lever 34 are engaged while smoothly sliding against each other. There are no drawbacks such as the inclined surface 54 and the holding portion 41 catching on each other or interfering with each other. The safety lever 50 returns to the state shown in FIG. 2 in which the safety device is operating. Therefore, the safety lever 50 is smoothly operated and can be reliably set to the state in which the safety device is operating and to the state in which it is released.

Figure 5:
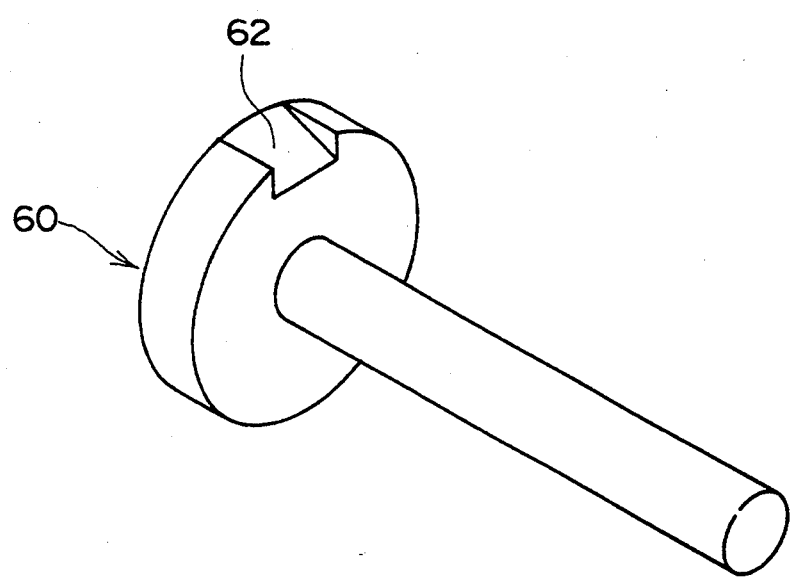
FIG. 5 is a perspective view showing another example of the safety lever of the mechanical ignition sensor relating to the first embodiment of the present invention.

In the mechanical ignition sensor 10 of the above-described embodiment, the inclined surface 54 is formed so as to slant by tapering around the entire circumference of the disc-shaped safety lever 50. However, the present invention is not limited to the same. As a safety lever 60 illustrated in FIG. 5, for example, the inclined surface 62 may be provided so that a portion of the entire circumference of the safety lever 60 is slanted. In this case, the inclined surface 62 of the safety lever 60 is disposed so as to correspond to the holding portion 41 of the trigger lever 34. Whether the safety lever 60 is moved in the operating direction or the releasing direction, the inclined surface 62 engages the holding portion 41 of the trigger lever 34 while smoothly sliding against each other. There are no drawbacks such as the inclined surface 62 and the holding portion 41 catching on each other or interfering with each other. The safety lever 60 is smoothly operated and can be reliably set to the state in which the safety device is operating and to the state in which it is released.

In the mechanical ignition sensor 10 of the above-described embodiment, the ignition pin 22 is held by one trigger lever 34. However, the number of the trigger lever 34 is not limited. There may be two or more trigger levers 34.

Further, the mechanical ignition sensor 10 of the above-described embodiment is used for a gas generator for a pretensioner. However, the present invention is not limited to the same. These sensors can be applied to other systems that will act upon the impact of the ignition pin 22.

Figure 6:
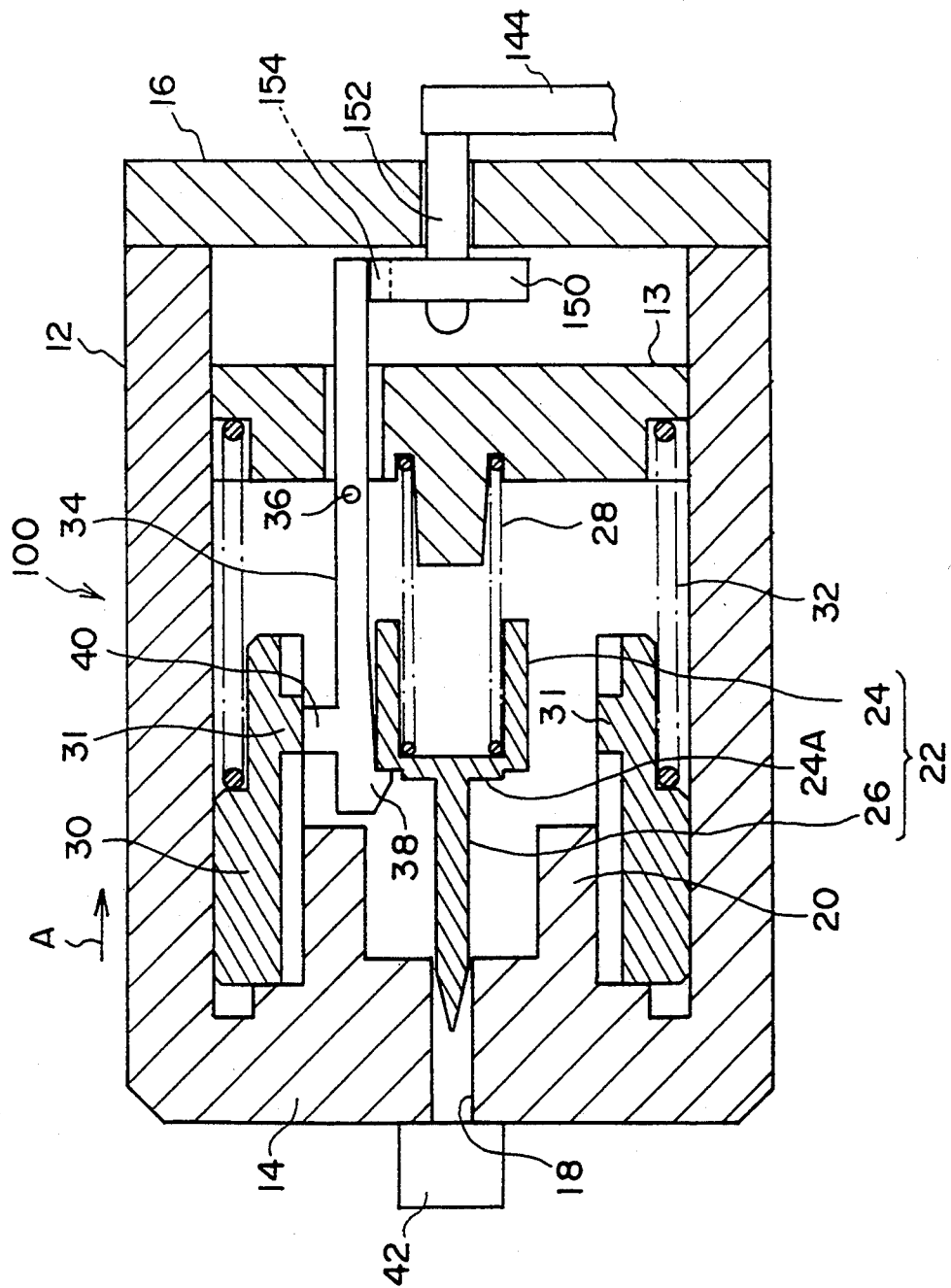
FIG. 6 is a cross-sectional view showing an initial state of a mechanical ignition sensor relating to a second embodiment of the present invention.
Figure 7:
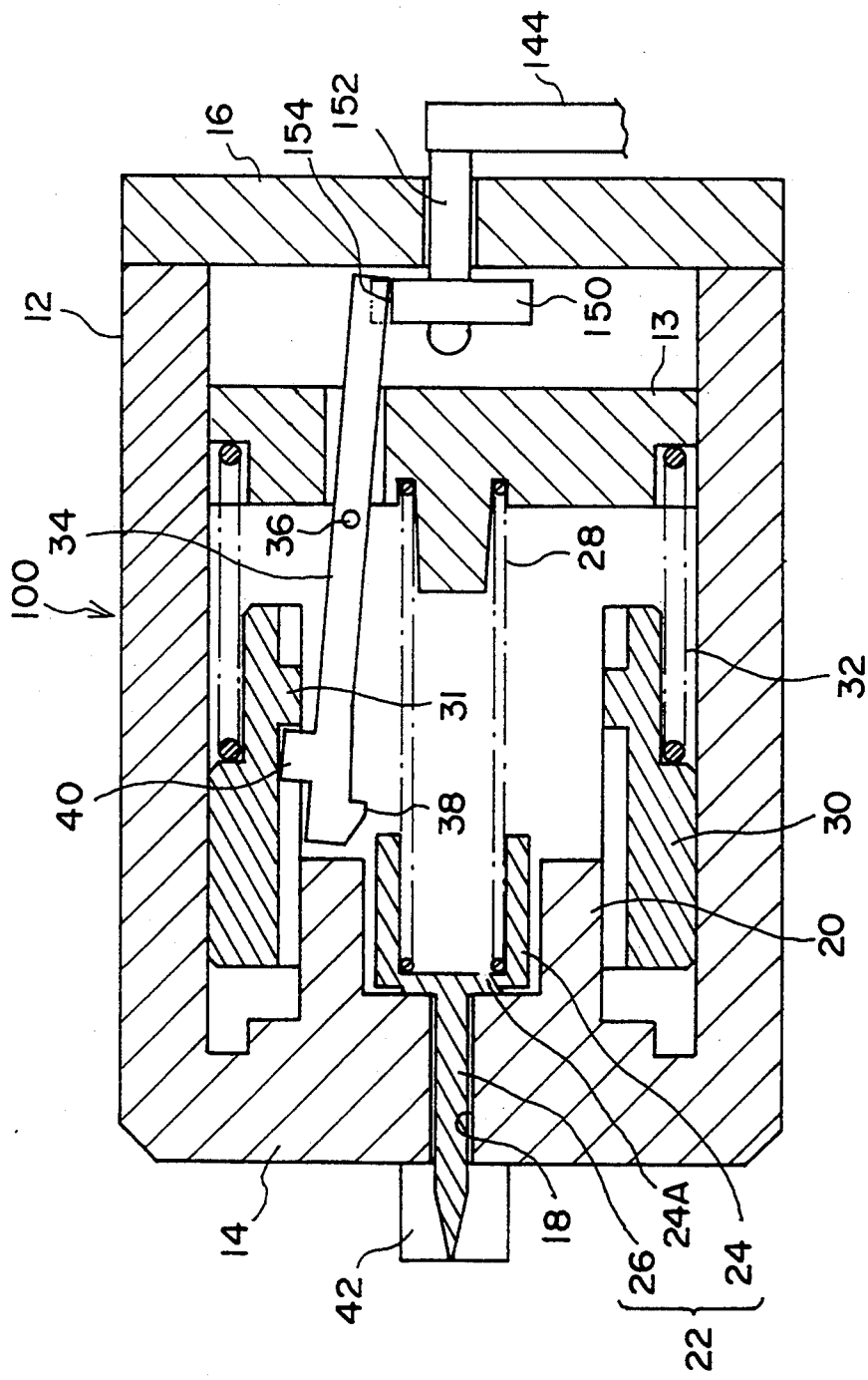
FIG. 7 is a cross-sectional view showing the state of the mechanical ignition sensor after having finished operation in accordance with the second embodiment of the present invention.

Next, a second embodiment of the present invention will be described. FIGS. 6 and 7 are cross-sectional views of a mechanical ignition sensor 100 relating to the second embodiment. Structures of the second embodiment are basically similar to those of the first embodiment. Parts which are the same as those in the first embodiment are denoted by the same reference numerals, and descriptions thereof are omitted.

The rear end portion (the end portion opposite the engaging portion 38) of the trigger lever 34 penetrates through the inner wall 13 and reaches the vicinity of the plate 16. A safety lever 150 is disposed in the vicinity of the rear end portion of the trigger lever 34.

Figure 8:
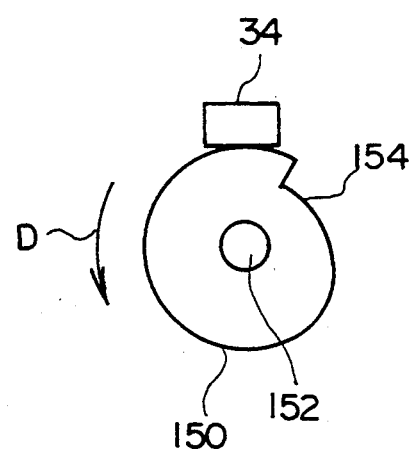
FIG. 8 is an elevational view which shows a shape of a safety lever of the mechanical ignition sensor relating to the second embodiment of the present invention, and which shows a relationship between the safety lever and a trigger lever.

As shown in. FIG. 8, the safety lever 150 is formed into a disc-shape and a shaft portion 152 is integrally attached to the axially central portion of the safety lever 150. A cut-out portion 154 is formed at the circumferential surface of the safety lever 150. The shaft portion 152 is pivotably supported to the plate 16 in a state in which the circumferential surface of the safety lever 150 faces the end portion of the trigger lever 34. In addition, an operation lever 144 is attached to the shaft portion 152 and can be operated from outside by an unillustrated releasing device or the like. In the state in which the safety device is operating, the circumferential surface of the safety lever 150 abuts the end portion of the trigger lever 34 so as to prevent the trigger lever 34 from rotating around the shaft 36. The safety lever 150 is rotated around the shaft portion 152 and the cut-out portion 154 opposes the end portion of the trigger lever 34. Accordingly, the safety lever 150 does not abut the trigger lever 34, and the trigger lever 34 can rotate around the shaft 36.

The operation of the second embodiment will be explained.

As shown in FIG. 8, in the state in which the safety device is operating (the state in which the sensor is inoperative), the circumferential surface of the safety lever 150 abuts the end portion of the trigger lever 34 so as to prevent the trigger lever 34 from rotating around the shaft 36. In this state, even if the large acceleration acts on the mechanical ignition sensor 10 and the inertial mass body 30 inertially moves (even if the slide portion 31 moves relative to the slide holding portion 40 of the trigger lever 34 so as to be separated), the trigger lever 34 is not pivoted. Accordingly, the holding of the ignition pin 22 is not released.

On the other hand, the operation lever 144 is operated so that the safety lever 150 is rotated in the direction of arrow D in FIG. 8 and the cut-out portion 154 opposes the end portion of the trigger lever 34. Here, the trigger lever 34 does not abut the safety lever 150 and can rotate around the shaft 36. The safety device becomes inoperative (the sensor becomes operative).

In the mechanical ignition sensor 100 relating to the second embodiment, the rotation of the trigger lever 34 is prevented by the safety lever 150. In other words, the safety lever 150 is not structured to prevent the movement of the inertial mass body 30 but is provided so as to correspond only to the trigger lever 34. Accordingly, when the safety lever 150 is applied to either the left-hand side occupant seat or the right-hand side occupant seat, it does not have to be different. The safety lever 150 can be used in common by the left-hand side occupant seat and the right-hand side occupant seat.

Figure 9:
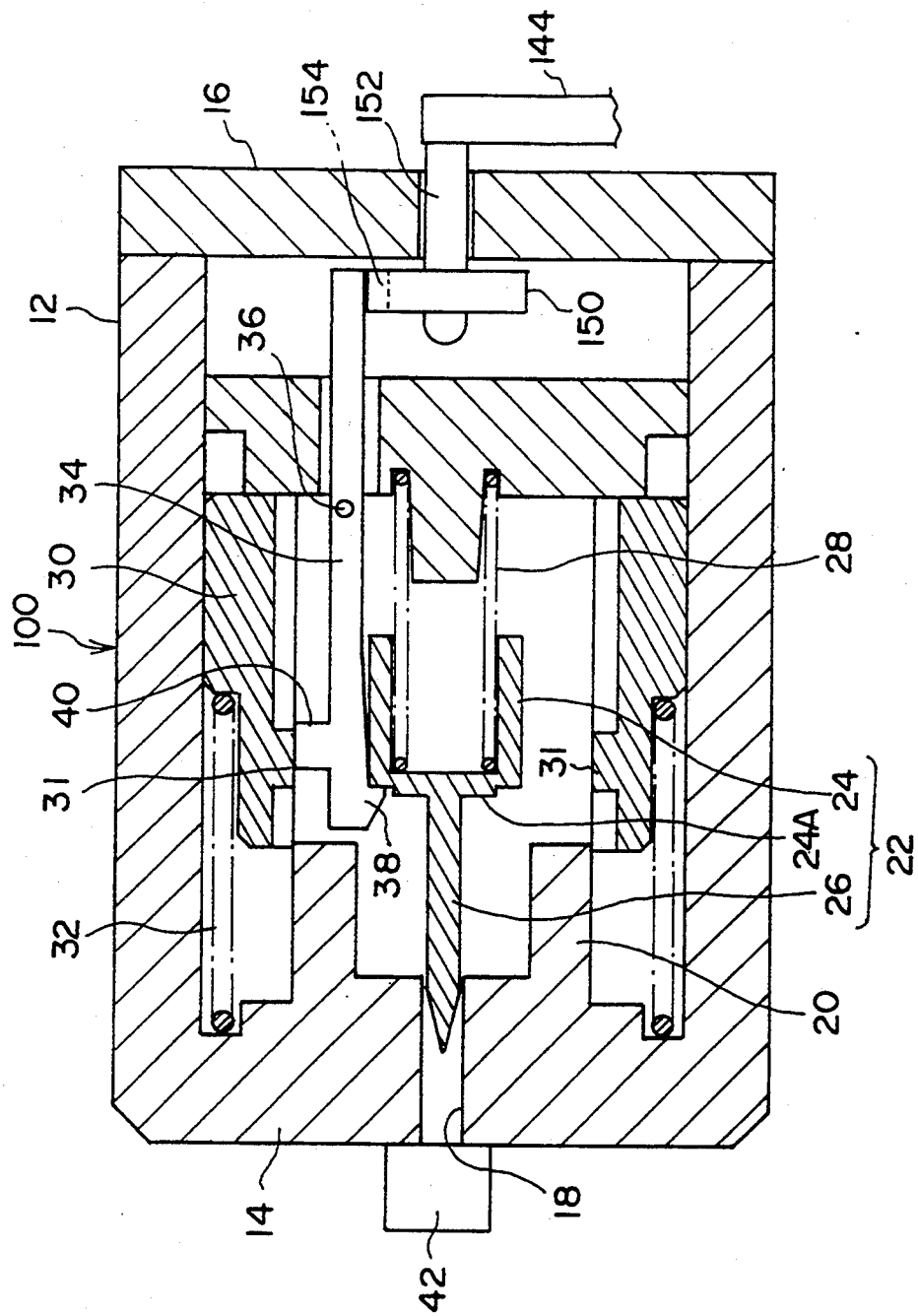
FIG. 9 is a cross-sectional view, corresponding to FIG. 6, which shows another assembling example of the mechanical ignition sensor relating to the second embodiment of the present invention.

Moreover, there is a case in which the directions of relative movement of the inertial mass body 30 are different (opposite) between the case in which the safety lever 150 is used by the left-hand side occupant seat and the case in which it is used by the right-hand side occupant seat. Even in this case, as shown in FIG. 9, by simply reversing the positions (the assembling directions) at which the inertial mass body 30 and the bias spring 32 are disposed, the safety lever 150 can be applied and used in common by the left-hand side occupant seat and the right-hand side occupant seat.

Accordingly, in the mechanical ignition sensor 100, stable operation is not prevented. The inertial mass body 30 and the safety lever 150 can be used in common by both the left-hand side occupant seat and the right-hand side occupant seat. Therefore, there is no need Tot the inertial mass body 30 and the safety lever 150 to be structured for exclusive use with either the left-hand side occupant seat or the right-hand side occupant seat.

Figure 11:
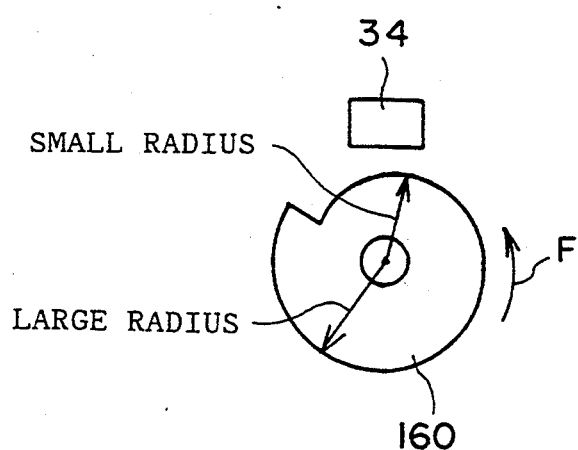
FIG. 11 is an elevational view which shows a variant example of the safety lever of the mechanical ignition sensor relating to the second embodiment of the present invention, and which shows a state in which the safety lever does not abut the trigger lever.
Figure 12:
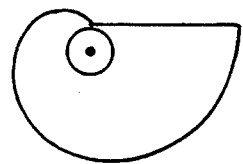
FIG. 12 is an elevational view showing a variant example of the safety lever of the mechanical ignition sensor relating to the second embodiment of the present invention.
Figure 13:
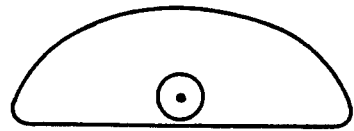
FIG. 13 is an elevational view showing a variant example of the safety lever of the mechanical ignition sensor relating to the second embodiment of the present invention.
Figure 14:
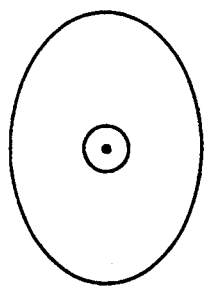
FIG. 14 is an elevational view showing a variant example of the safety lever of the mechanical ignition sensor relating to the second embodiment of the present invention.
Figure 15:
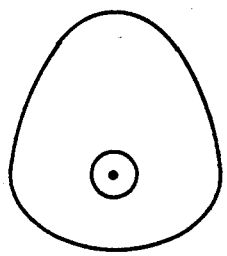
FIG. 15 is an elevational view showing a variant example of the safety lever of the mechanical ignition sensor relating to the second embodiment of the present invention.

In the mechanical ignition sensor 100 of the second embodiment, the safety lever 180, which holds the trigger lever 34, is formed into a disc-shape and has the cut-out portion 154 formed on its circumferential surface. However, the present invention is not limited to the same, and the safety lever 150 may be formed in any configuration provided that the area which abuts the trigger lever 34 and the area which does not abut it may be formed and provided that both areas are selected by rotation. For example, as the safety lever 160 shown in FIGS. 10 and 11, the safety lever 160 may be formed so that the rotating circumferential surface, which corresponds to the end portion of the trigger lever 34, has gradually increased in radiuses (for example, formed into an involute shape shown in FIG. 12 and a cycloidal shape in FIG. 13) from the area in which the safety lever 160 does not abut the trigger lever 34 to the area in which it abuts the trigger lever 34. Further, it may be formed into an oval shape shown in FIG. 14 and a cam shape shown in FIG. 15.

Figure 10:
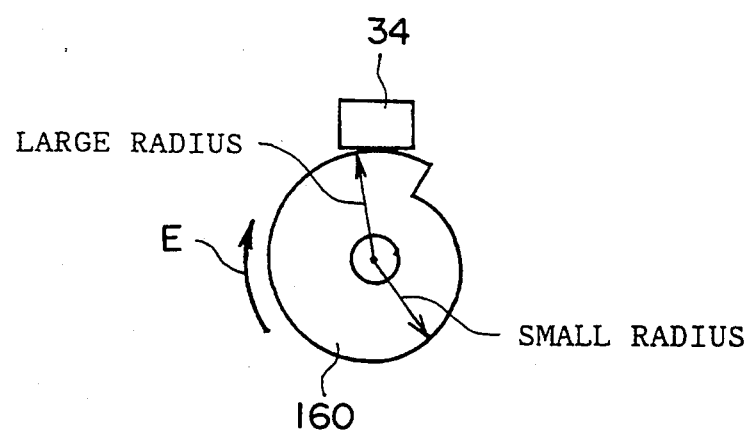
FIG. 10 is an elevational view which shows a variant example of the safety lever of the mechanical ignition sensor relating to the second embodiment of the present invention, and which shows a state in which the safety lever abuts the trigger lever.

In this case, the safety lever 160 can be smoothly rotated either in the operating direction or the releasing direction. For example, there is a case in which the safety lever 160 is pivoted from the state in which the safety device is operating (the state shown in FIG. 10) to the state in which the safety device is released (the state shown in FIG. 11) in the direction of arrow E in FIG. 10, and thereafter, the safety lever 160 is pivoted again in the opposite direction (the direction of arrow F in FIG. 11) so as to be reset to the state in which the safety device becomes operative. Even in this case, the rotating circumferential surface of the safety lever 160 abuts the trigger lever 34 while sliding against each other. There are no drawbacks such as the trigger lever 34 and the rotating circumferential surface of the safety lever 160 catching on each other or interfering with each other. The safety device becomes operative again as shown in FIG. 10. The safety lever 160 is smoothly operated and the operation and the release of the safety device can be reliably effected.

In the mechanical ignition sensor 100 of the second embodiment, the ignition pin 22 is held by one trigger lever 34. However, the number of the trigger lever 34 is not limited to the same. There may be two or more trigger levers 34.

Further, the mechanical ignition sensor 10 of the second embodiment is used for a gas generator for a pretensioner. However, the present invention is not limited to the same. These sensors can be applied to other systems that will act upon the impact of the ignition pin 22.

What is claimed is:

1. A mechanical ignition sensor, comprising:
    an ignition pin movably disposed along an axial direction of the ignition pin and moved in the axial direction by an urging force of a firing spring so as to ignite a detonator;
    an inertial mass body always urged by a bias spring and moved by the inertial force against the urging force of the bias spring when a predetermined load acts on the inertial mass body;
    a trigger lever disposed between said ignition pin and said inertial mass body and pivotably supported by a supporting shaft in the direction of approaching and moving away from said ignition pin, said trigger lever including an engaging portion which engages said ignition pin, said engaging portion normally engaging said ignition pin and being pressed by said inertial mass body so as to prevent said trigger lever from rotating around said supporting shaft, while said engaging portion is pressed by said ignition pin in the direction of moving away from said ignition pin, said ignition pin is held against the urging force of said firing spring at a position which is separated from said detonator, when said inertial mass body is moved, the state in which the rotation of said trigger lever is prevented by said inertial mass body is released so as to rotate said trigger lever in a direction of moving away from said ignition pin and to allow the movement of said ignition pin; and
    a safety lever which is located so as to correspond to an end portion of said trigger lever on the side opposite said engaging portion with respect to said supporting shaft and which is movably disposed in the axial direction of said ignition pin, said safety lever including an inclined surface which contacts the end portion of said trigger lever and is formed so as to slant with respect to the moving direction of said ignition pin along the axial line, said inclined surface normally engaging the end portion of said trigger lever so as to prevent said trigger lever from rotating around said supporting shaft, said safety lever moving along the axial direction of said ignition pin so that said inclined surface is disengaged from said trigger lever and said trigger lever can rotate around said supporting shaft.

2. A mechanical ignition sensor according to claim 1, wherein an inclined surface, which corresponds to said inclined surface of said safety lever, is formed on a surface of the end portion of said trigger lever which contacts said inclined surface of said safety lever.

3. A mechanical ignition sensor according to claim 1, wherein said safety lever includes a shaft portion, in which an axial direction of said ignition pin is an axial line, and a plate-shaped engaging portion, which is provided at the end portion of the shaft portion in the direction of said ignition pin; and an inclined surface is formed only on the surface which engages the end portion of said trigger lever among the entire circumference of the plate-shaped engaging portion.

4. A mechanical ignition sensor according to claim 1, wherein the inclined surface of said safety lever faces the opposite direction of said ignition pin, and an inclined surface is formed at the end portion of said trigger lever in the direction so as to contact the inclined surface of said safety lever.

5. A mechanical ignition sensor according to claim 1, wherein said safety lever includes a shaft portion, in which an axial direction of said ignition pin is an axial line, and a plate-shaped engaging portion, which is provided at the end portion of the shaft portion in the direction of said ignition pin, and an inclined surface is formed on the entire circumference of the plate-shaped engaging portion.

6. A mechanical ignition sensor according to claim 5, wherein said engaging portion is formed into a disc-shape and an inclined surface is formed on the entire circumference of said disc-shaped engaging portion.

7. A mechanical ignition sensor, comprising:
an ignition pin movably disposed along an axial direction of the ignition pin and moved in the axial direction by an urging force of a firing spring so as to ignite a detonator;
an inertial mass body always urged by a bias spring and moved by the inertial force against the urging force of the bias spring when a predetermined load acts on the inertial mass body;
a trigger lever disposed between said ignition pin and said inertial mass body and pivotably supported by a supporting shaft in the direction of approaching and moving away from said ignition pin, said trigger lever including an engaging portion which engages said ignition pin, said engaging portion normally engaging said ignition pin and being pressed by said inertial mass body so as to prevent said trigger lever from rotating around said supporting shaft, while said engaging portion is pressed by said ignition pin in the direction of moving away from said ignition pin, said ignition pin is held against the urging force of said firing spring at a position which is separated from said detonator, when said inertial mass body is moved, the state in which the rotation of said trigger lever is prevented by said inertial mass body is released so as to rotate said trigger lever in a direction of moving away from said ignition pin and to allow the movement of said ignition pin; and
a safety lever which is rotatably located so as to correspond to an end portion of said trigger lever on the side opposite said engaging portion with respect to said supporting shaft, a circumferential surface of said safety lever normally limiting movement of the end portion of said trigger lever and preventing said trigger lever from rotating around said supporting shaft, and limitation of movement of the end portion of said trigger lever being released by the rotation of said safety lever so as to allow said trigger lever to rotate around said supporting shaft.

8. The mechanical ignition sensor according to claim 7, wherein said safety lever includes a shaft portion and a cut-out portion, said shaft portion is formed into a disc-shape in the direction of movement of said ignition pin, and said cut-out portion is formed on the circumferential surface of said safety lever so as to face the end portion of said trigger lever.

9. The mechanical ignition sensor according to claim 7, wherein the circumferential surface of said safety lever normally abuts the end portion of said trigger lever so as to prevent said trigger lever from rotating around said supporting shaft, and the state in which the circumferential surface abuts the end portion of said trigger lever is released by the rotation of said safety lever so as to allow said trigger lever to rotate around said supporting shaft.

10. The mechanical ignition sensor according to claim 9, wherein the end portion of said trigger lever is normally mounted on said safety lever so as to prevent said trigger lever from rotating around said supporting shaft, and the state in which the end portion of said trigger lever is mounted on said safety lever is released by the rotation of said safety lever so as to allow said trigger lever to rotate around said supporting shaft.

11. The mechanical ignition sensor according to claim 9, wherein said safety lever is formed so that a rotating circumferential surface of said safety lever, which corresponds to the end portion of said trigger lever, has gradually increased in radiuses from an area in which the circumferential surface does not abut said trigger lever to an area in which the circumferential surface abuts said trigger lever.

12. The mechanical ignition sensor according to claim 11, wherein said safety lever is formed into an involute shape.

13. The mechanical ignition sensor according to claim 11, wherein said safety lever is formed into a cycloidal shape.

14. The mechanical ignition sensor according to claim 11, wherein said safety lever is formed into an oval shape.

15. The mechanical ignition sensor according to claim 11, wherein said safety lever is formed into a cam shape.

* * * * *